(12) United States Patent
Hsu

(10) Patent No.: US 7,034,718 B2
(45) Date of Patent: Apr. 25, 2006

(54) KEYBOARD WITH ELEVATED KEYS

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 373 days.

(21) Appl. No.: 10/397,456

(22) Filed: Mar. 26, 2003

(65) Prior Publication Data

US 2003/0193419 A1 Oct. 16, 2003

(30) Foreign Application Priority Data

Mar. 28, 2002 (TW) ............................... 91106179 A

(51) Int. Cl.
*H03K 17/94* (2006.01)
*H03M 11/00* (2006.01)

(52) U.S. Cl. ..................... 341/22; 341/21; 341/26; 200/344; 400/473; 400/495; 36/680

(58) Field of Classification Search ............ 341/21–26; 200/344; 400/473, 495; 361/680
See application file for complete search history.

(56) References Cited

U.S. PATENT DOCUMENTS

| | | | | |
|---|---|---|---|---|
| 5,670,759 A | * | 9/1997 | Hsu | 200/5 A |
| 6,133,538 A | * | 10/2000 | Hsu | 200/344 |
| 6,388,219 B1 | * | 5/2002 | Hsu et al. | 200/517 |
| 6,491,456 B1 | * | 12/2002 | Shih et al. | 400/473 |
| 6,504,120 B1 | * | 1/2003 | Hsu | 200/344 |
| 6,545,238 B1 | * | 4/2003 | Hsu et al. | 200/344 |
| 6,559,399 B1 | * | 5/2003 | Hsu et al. | 200/344 |
| 6,713,700 B1 | * | 3/2004 | Hsu | 200/344 |
| 6,726,093 B1 | * | 4/2004 | Hsu et al. | 235/375 |
| 6,747,867 B1 | * | 6/2004 | Hsu | 361/680 |
| 6,761,494 B1 | * | 7/2004 | Hsu et al. | 400/495 |

* cited by examiner

*Primary Examiner*—Michael Horabik
*Assistant Examiner*—Kimberly Jenkins
(74) *Attorney, Agent, or Firm*—Ladas & Parry LLP

(57) ABSTRACT

A keyboard with elevated keys for a notebook computer. The keys of the keyboard are elevated when the notebook computer is opened, and can be depressed when the flat display is closed. The keyboard has keys movably connected to the foundation sheet through scissors-type linking mechanisms. A plurality of guiding sheets is movably disposed on a foundation sheet and has hooks and tracks. Each of the tracks is parallel to a first direction. A sliding member is movably disposed on the foundation sheet and has protrusions extending into each of the tracks. When the sliding member moves in the first direction, the protrusions move the guiding sheets from a first position to a second position. The hooks of the guiding sheets sequentially press the scissors-type linking mechanism of each key to depress the keys of the keyboard from elevated position to depressed position.

14 Claims, 8 Drawing Sheets

KEYBOARD WITH ELEVATED KEYS

BACKGROUND OF THE INVENTION

1. Field of the Invention

The present invention relates to a keyboard with elevated keys, and in particular to a keyboard with keys that can be elevated sequentially.

2. Description of the Related Art

FIG. 1A is an exploded view of an elevated key of a conventional keyboard. In order to simplify the drawing, FIG. 1 only shows one elevated key of a conventional keyboard. In FIG. 1A, the elevated key of a keyboard for a notebook computer includes a key cap 11, a cap support 12, an elastic sheet 13, a circuit membrane assembly 14, a base sheet 15 and a guiding sheet 16.

The base sheet 15 is a metal sheet on which two seats 151 and a hook 152 are formed by punching and contacting.

The circuit membrane assembly 14 is disposed on the base sheet 15. It comprises the circuit of the keyboard and a plurality of holes 141 with respect to the seats 151 and the hook 152 of the base sheet 15.

The elastic sheet 13 has a sheet-like body, an elastic dome 131, a connecting portion 133 and holes 132. The connecting portions 133 connect the elastic dome 131 and the sheet-like body. Further, the elastic dome 131 has a plunger (not shown) inside to contact the circuit membrane assembly 14 and conduct the circuit on thereto.

The guiding sheet 16 is disposed on the elastic sheet 13 and can be moved horizontally. It has two L-shaped hooks 161 and a hole 163 with respect to the elastic dome 131 of the elastic sheet 13 and the seats 151 and the hook 152 on the base sheet 15.

The cap support 12 has a first linking bracket 121 and a second linking bracket 122 which hinged together and as a scissors-type support mechanism. Furthermore, the first linking bracket 121 has shaft rods 1212, 1213 formed on both sides thereon. The second linking bracket 122 has shaft rods 1221 formed on both sides thereon.

FIG. 1B is a schematic back view of a key cap of the elevated key in FIG. 1A. In FIG. 1B, the key cap 11 has hooks 111 and holding portions 112 on its bottom surface.

FIG. 1C is a schematic view of the elevated key in FIG. 1A with the key cap removed. In FIGS. 1A~1C, while assembling the conventional elevated key, the circuit membrane assembly 14, the elastic sheet 13 and the guiding sheet 16 are put on the base sheet 15. The seats 151 and the hook 152 of the base sheet 15 protrude through the holes 141 of the circuit membrane assembly 14, the holes 132 of the elastic sheet 13 and the hole 163 of the guiding sheet 16. The key cap 11 is mounted on the base sheet 15 via the cap support 12. The shaft rods 1212 are inserted into the seats 151 so that the first linking bracket 121 is rotatable with respect to the base sheet 15. The narrow portion 1223 of the second linking bracket 122 is hooked by the hook 152 of the base sheet 15 so that the second linking bracket 122 is also rotatable with respect to the base sheet 15. The hooks 111 hold the shaft rods 1213 of the first linking bracket 121, and the holding portions 112, hold the shaft rod 1222 of the second linking bracket 122. Furthermore, in FIG. 1C, the L-shaped hooks 161 selectively press both arms of the first linking bracket 121.

In operation, the user pushes down the key cap 11 and compresses the elastic dome 131. Then, the elastic dome 131 deformed and pushes the circuit membrane assembly 14 so that an electric conduction therein is induced and sends out a corresponding signal.

FIG. 2A and FIG. 2B are cross sections of the elevated key according to the FIG. 1A when the guiding sheet is in a first position and in a second position correspondingly. In FIG. 2A, when the guiding sheet 16 is in the first position, the hooks 161 contact both arms of the first linking bracket 121, and the key cap 11 is in the original typing position. In FIG. 2B, when the guiding sheet 16 is in the second position, the hooks 161 presses both arms of the first linking bracket 121. The scissors-type support structure approaches the base sheet 15, such that the key cap 11 descends to the depressed position. Furthermore, when the guiding sheet 16 returns to the original position in FIG. 2A from the depressed position, the hooks 161 release the first linking bracket 121, or the scissors-type linking mechanism. The elastic dome (not shown) provides an elastic force to elevate the key cap 11.

The conventional keyboard for a notebook computer has at least 100 keys. The friction force between the guiding sheet 16 and the arms of the first linking bracket 121 is very large when moving the guiding sheet 16 to depress all of the keys 11. Thus, it needs a thick guiding sheet to provide a large horizontal force to overcome the friction and contact all of the keys at the same time, but the thick guiding sheet increases the profile weight of the notebook computer.

SUMMARY OF THE INVENTION

Accordingly, an object of the invention is to provide a keyboard with sequentially elevated keys. The keys of the keyboard are divided into several groups, which can be elevated sequentially by a plurality of guiding sheets, to reduce the required horizontal force and the thickness and rigidity of the guiding sheets.

Another object of the invention is to provide a keyboard with elevated keys for a notebook computer. The keys of the keyboard can be selectively elevated or depressed by a plurality of horizontally moved guiding sheets, to be elevated when the flat display of notebook computer is open and can be depressed when the flat display is closed. Thus, the notebook computer has a thinner profile.

The present invention provides a keyboard with elevated keys. The keyboard has a foundation sheet, a plurality of key sets, a plurality of guiding sheet, a sliding member and a connecting belt. The keys are movably connected to a foundation sheet through scissors-type linking mechanism between elevated position and depressed position. The guiding sheets have hooks and tracks which parallel to a first direction, respectively. The guiding sheets are disposed on a foundation sheet and can be moved in a second direction. The distance between each of two neighboring guiding sheets is a first interval. The sliding member is movably disposed on the foundation sheet and has protrusions extending into each of the tracks. The distance between each of two neighboring protrusions is a second interval. The first intervals between each of the two neighboring guiding sheets are unequal to the second intervals between two neighboring protrusions. When the sliding member moves in the first direction, the protrusions move the guiding sheets from the first position to the second position. The hooks of the guiding sheets push the scissors-type linking mechanism to depress the keys.

According to the invention, the first direction is perpendicular to the second direction. Each of the scissors-type linking mechanism includes a first linking bracket and a second bracket pivoted together. Each of the keys has an elastic dome disposed under the key cap.

Moreover, when the sliding member moves in the second direction, the protrusions move the guiding sheets from the is second position to the first position, such that the hooks release the scissors-type linking mechanisms, and the key caps are elevated by the elastic domes.

Each of the tracks has a first portion, a second portion, and a connecting portion. The first portion and the second portion are parallel to the first direction and connected by the connecting portion. The distance between the first portion and the second portion is a third interval, equal to the distance between the first position and the second position.

The present invention also provides a keyboard for a notebook computer. The keyboard is assembled in the main body of the notebook computer. The keyboard has a plurality of keys movably connected to a foundation sheet through scissors-type linking mechanism between elevated position and depressed position. A plurality of guiding sheets are movably disposed on a foundation sheet and have hooks and tracks. Each of the tracks is parallel to a first direction. A sliding member is movably disposed on the foundation sheet and has protrusions extending into each of the tracks. The first intervals between two neighboring guiding sheets are unequal to the second intervals between two neighboring protrusions. When the flat display of the notebook computer is closed, the sliding member is pushed along the first direction and the protrusions move the guiding sheets from the first position to the second position. The hooks of the guiding sheets contact the scissors-type linking mechanism to depress the keys.

Moreover, the first direction is perpendicular to the second direction. Each scissors-type linking mechanism includes a first linking bracket and a second bracket pivoted together. Each of the keys has an elastic dome disposed under the key cap.

Moreover, an operating means for providing an elastic force to the sliding member is applied. When the flat display is open, the sliding member moves in the second direction, and the protrusions move the guiding sheets from the second position to the first position, such that the hooks release the scissors-type linking mechanisms, and the elastic domes elevate the key caps.

Each of the tracks has a first portion, a second portion and a connecting portion. The first portion and the second portion are parallel to the first direction and connected by the connecting portion. the distance between the first portion and the second portion is a third interval, equal to the distance between the first position and the second position.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
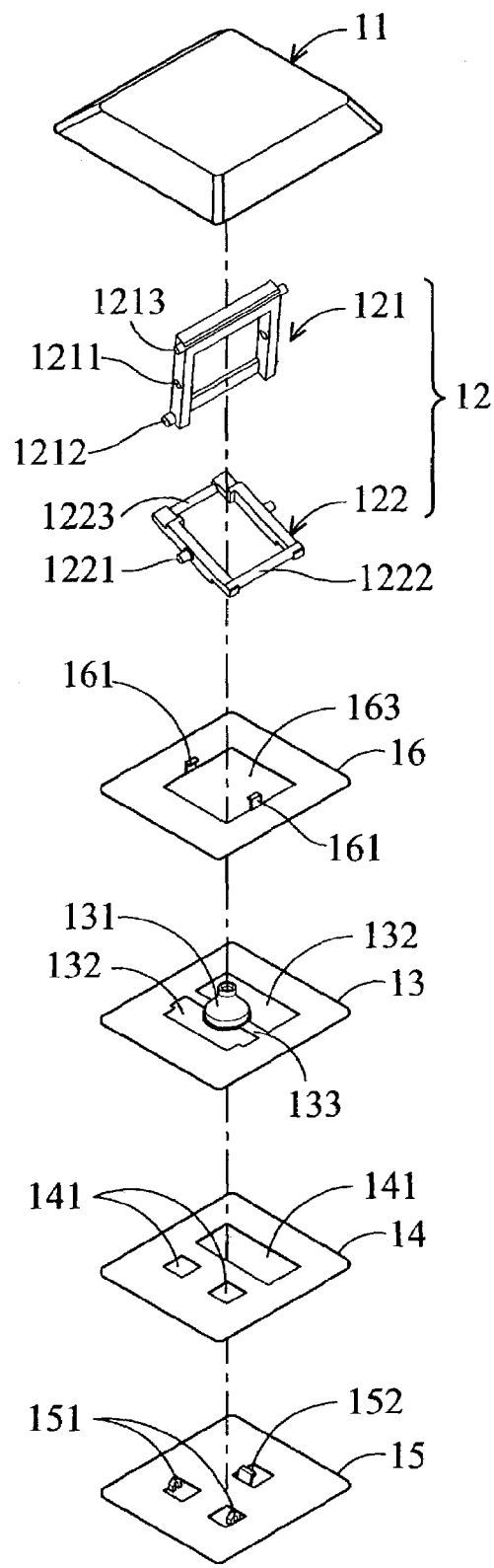
FIG. 1A is an exploded view of elevated keys of the conventional keyboard as referenced in the Prior Art.
Figure 1B:
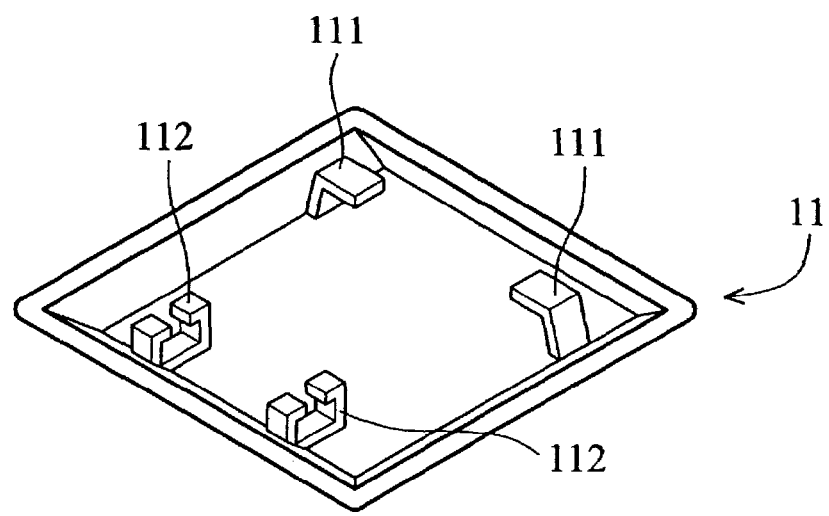
FIG. 1B is a schematic back view of a key cap of the elevated key in FIG. 1A.
Figure 1C:
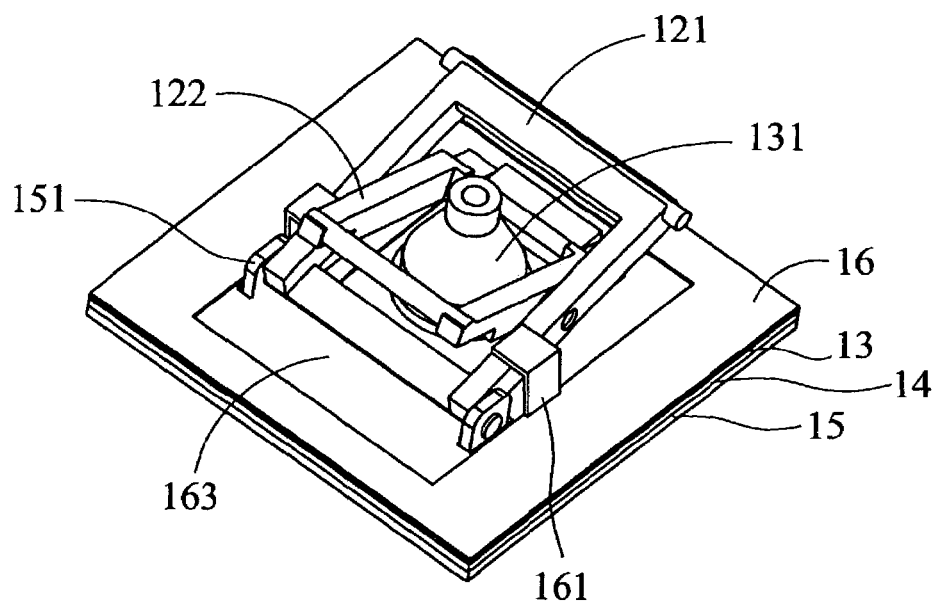
FIG. 1C is a schematic view of the elevated key removing the key cap in FIG. 1A.
Figure 2A:
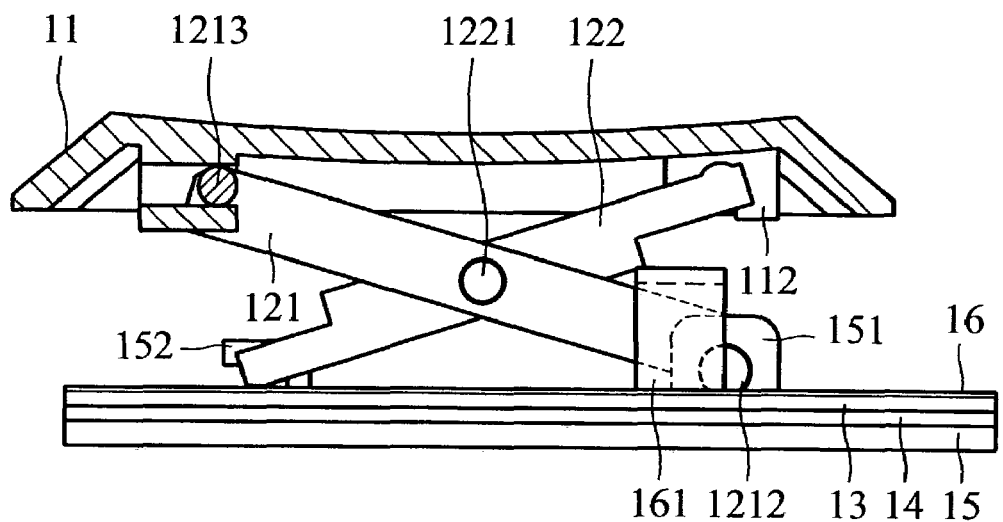
FIG. 2A is a cross section of the elevated key when the guiding sheet is in a first position.
Figure 2B:
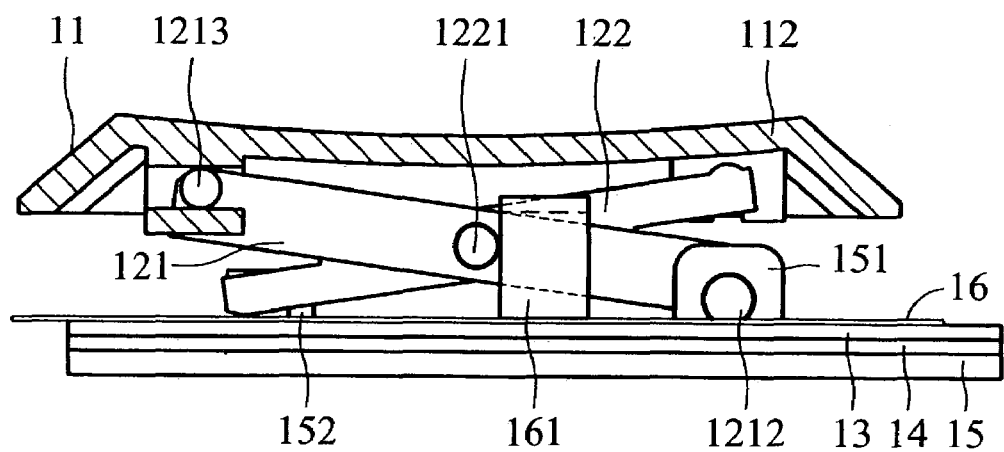
FIG. 2B is a cross section of the elevated key when the guiding sheet is in a second position.
Figure 3:
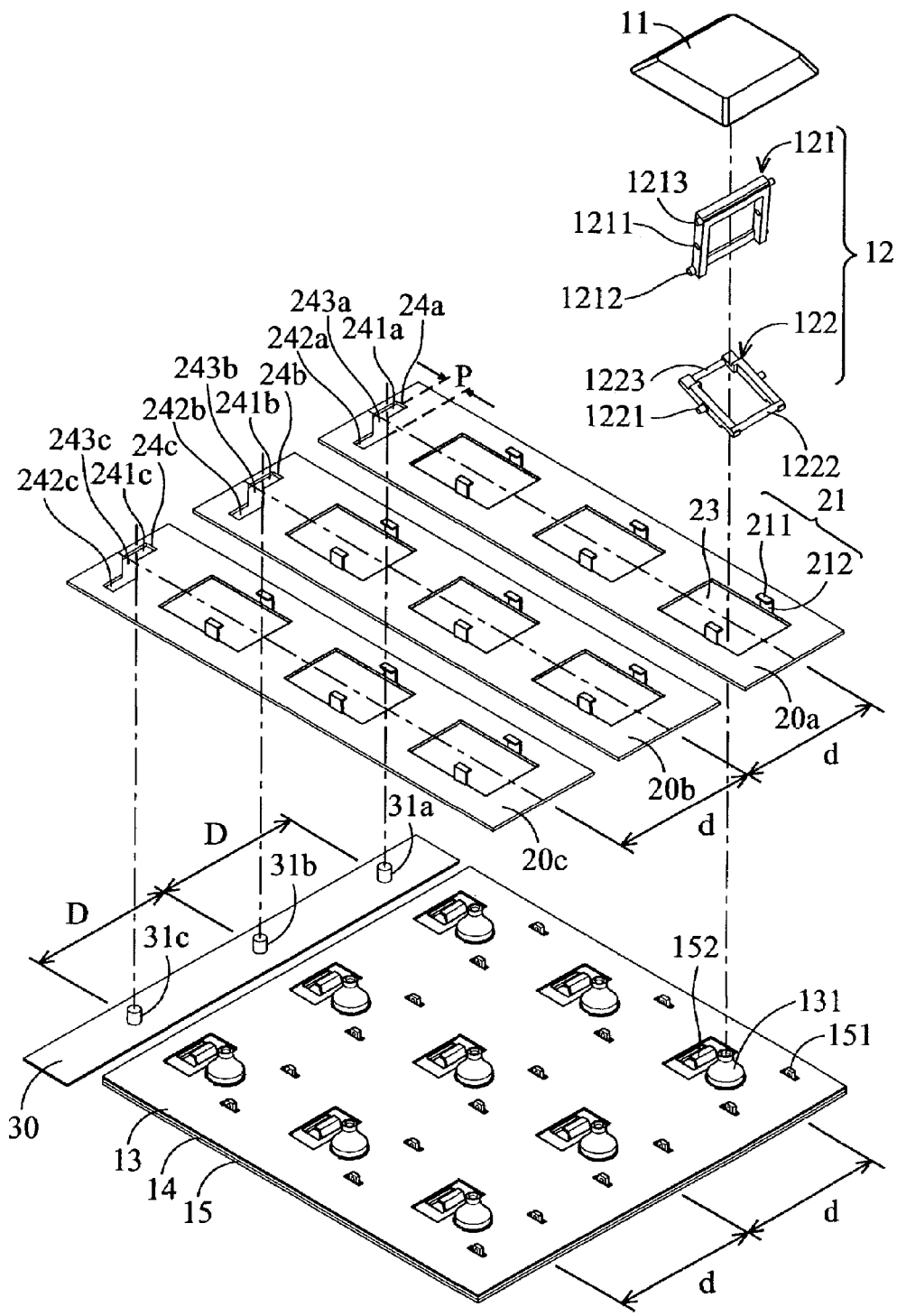
FIG. 3 is an exploded view of a 3×3 keyboard with elevated keys of the invention.

FIG. 3 is an exploded view of a keyboard with elevated keys of the invention. In order to simplify the drawing, FIG. 3 only shows a 3×3 array of the keyboard and an elevated key structure of the invention. In FIG. 3, the keyboard of the invention comprises a foundation sheet, a sliding member 30, a plurality of guiding sheets 20a~20c and a plurality of key sets (only one key is shown in FIG. 3).

The foundation sheet includes a base sheet 15, a circuit membrane assembly 14 and an elastic sheet 13. The structure and assembly method are described in the Prior Art. Furthermore, the cap support 12 includes a first linking bracket 121 and a second linking bracket 122. The first linking bracket 121 of the cap support 12 can be pressed or released by the hooks 21 of the guiding sheet 20a to depress or elevate the key cap 11.

In this embodiment, a whole guiding sheet in the Prior Art is divided into a plurality of guiding sheets 20a~20c. They are long narrow metal strips parallelly disposed on the foundation sheet to reduce both the friction force when moving. horizontally, and the thickness of the keyboard. Referring to the FIG. 3, the distances between the centerlines of the guiding sheets 20a~20c are equal to a first interval d. Using the guiding sheet 20a as an example, the guiding sheet 20a has three pairs of L-shaped hooks 21, three holes 23 and a Z-shaped track 24a. The holes 23 allow the elastic domes 131 on the elastic sheet 13 and the seats 151 and hooks 152 of the base sheet 15 to pass through. The hooks 21 are formed by punching and contacting. Each of the hooks 21 has a horizontal portion 211 and a vertical portion 212 and forms an inverted L-shaped hook. The hooks 21 contact the first linking bracket 121 to depress the key cap 11. That is the horizontal portions 211 of the hooks 21 start pressing the arms of the first linking bracket 121 when the guiding sheet 20a starts moving from a first position to a second position. The hooks 21 do not contact the cap support 12 when the guiding sheet 20a is in a first position, and the hooks 21 depress the cap support 12 to a depressed position when the guiding sheet 20a is in a second position. The total thickness of the keyboard is reduced because the key cap 11 is received in a depressed position.

The Z-shaped track 24a has a first portion 241a, a second portion 242a and a connecting portion 243a. The diagonal connecting portion 243a connects the first portion 241a and the second portion 242a. The first portion 241a and the second portion 242a are parallel to each other in a first direction and perpendicular to the longitudinal centerline, or a second direction, of the guiding sheet 20a. The distance between the first portion 241a and the second portion 242a of the Z-shaped track 24a is defined as a third interval p. It is equal to the distance between the first position and the second position of the guiding sheets 20a.

The sliding member 30 is a thin metal or plastic board disposed on the foundation sheet. The sliding member 30 has three protrusions 31a~31c. The distance between neighboring protrusions is defined as a second interval D, smaller than the first interval d. The sliding member 30 can move in the direction perpendicular to the longitudinal centerline of the guiding sheets 20a~20c. The protrusions 31a~31c extend into the tracks 24a~24c of the guiding sheets 20a~20c. When the sliding member 30 moves in the first direction, the protrusions 31a~31c sequentially move the guiding sheets 20a~20c by a distance of the third interval p. Thus, the hooks 21 of the guiding sheets 20a~20c can depress or release the cap supports 12 to depress or elevate the keys relating to the foundation sheet.

The details of storing the keys of the keyboard of the invention are provided as follows. In order to simplify the drawings, FIGS. 4B, 4D and 4F do not show the elastic domes.

Figures 4A, 4B:
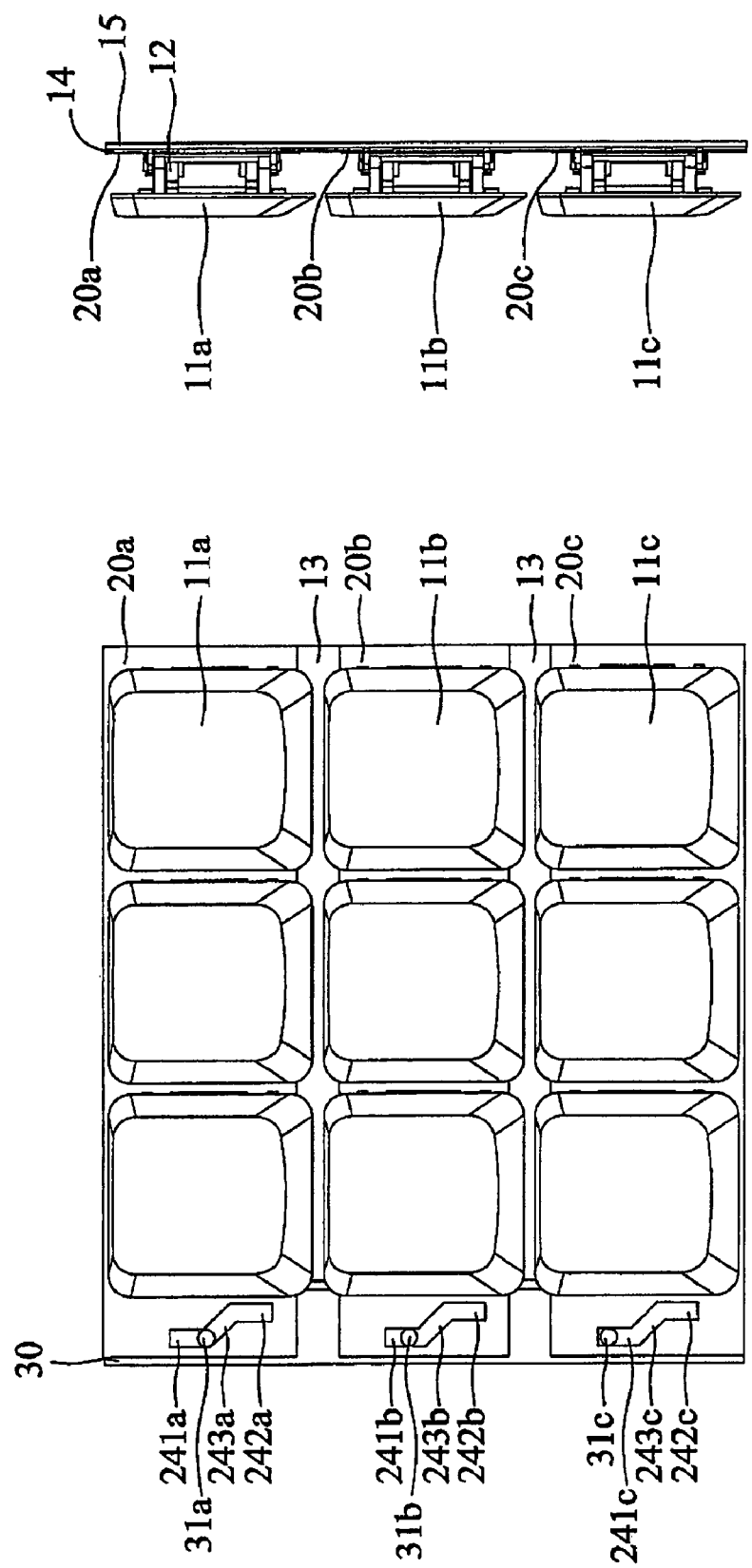
FIG. 4A is a schematic top view of the keyboard when the sliding member is at the original place.
FIG. 4B is a schematic side view of the keyboard when the sliding member is at the original place.

FIGS. 4A and 4B are schematic top and side views of the keyboard when the sliding member is in the original position. In FIGS. 4A and 4B, the second interval D is smaller than the first interval d. When the protrusion 31c is at the end of the first portion 241c of the track 24c, the protrusion 31b is at the intermediate zone of the first portion 241b of the track 24b, and the protrusion 31a is at the intersection of the first portion 241a and the connecting portion 243a of the track 24a. In the meantime, the cap supports 12 of the keys are not depressed and in the elevated position.

Figure 4D:
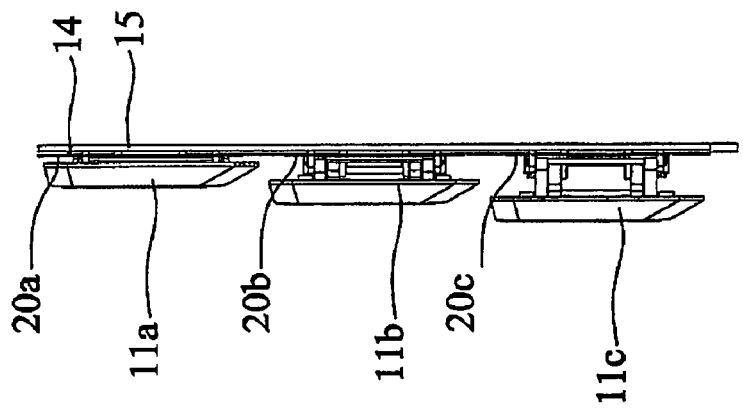
FIG. 4D is another schematic side view of the keyboard when the sliding member is at the midpoint.
Figure 4C:
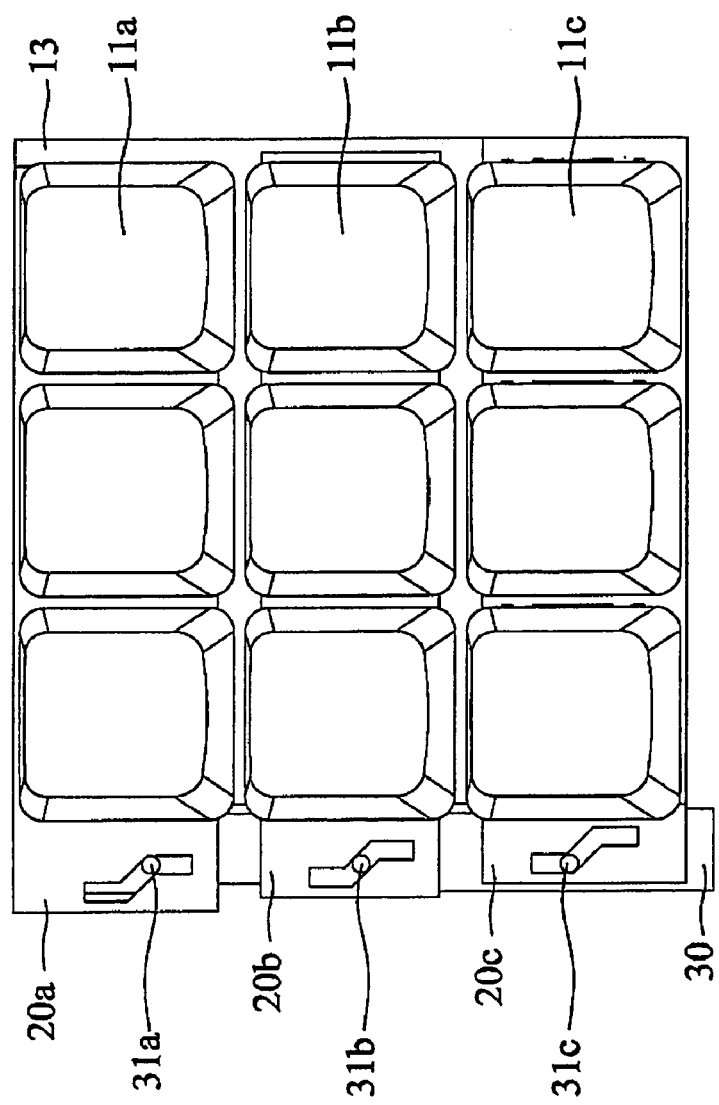
FIG. 4C is another schematic top view of the keyboard when the sliding member is at the midpoint.

FIGS. 4C and 4D are schematic top and side views of the keyboard during the sliding member is moved. In FIGS. 4C and 4D, because the second interval D between each neighboring protrusions 31a~31c is smaller than the first interval d between each neighboring guiding sheets 20a~20c, the protrusion 31a pushes the guiding sheet 20a leftward at a third interval p while the sliding member moving downward, and the protrusion 31a moving into the intersection of the second portion 242a and the connecting portion 243a of the track 24a. The cap supports 12a disposed over the guiding sheet 20a are depressed, and the key caps 11a are in the depressed position. Furthermore, the protrusion 31b moves into the intermediate zone of the connecting portion 243b of the track 24b, and the protrusion 31c moves into the intersection of the first portion 241c and the connecting portion 243c of the track 24c because the second interval D is smaller than the first interval d. The protrusion 31b starts pushing the guiding sheet 20b leftward, the cap supports 12 disposed over the guiding sheet 20b are depressed slightly, and the key caps 11b are at the midpoint between the elevated position and the depressed position. The key caps 11c, however, are in the original position because the guiding sheet 20c is not moved.

Figure 4F:
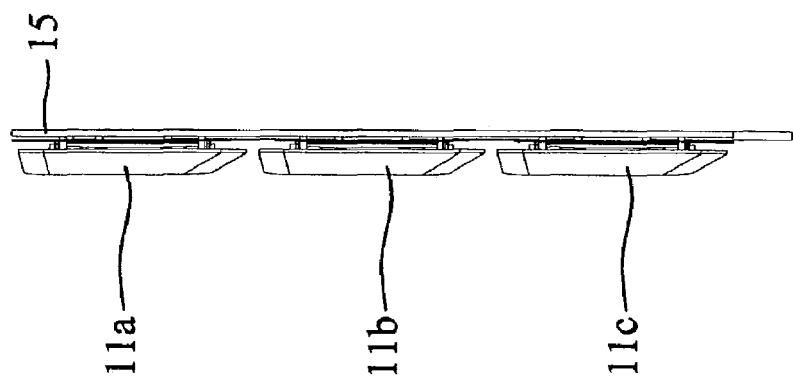
FIG. 4F is another schematic side view of the keyboard when the sliding member is at the end.
Figure 4E:
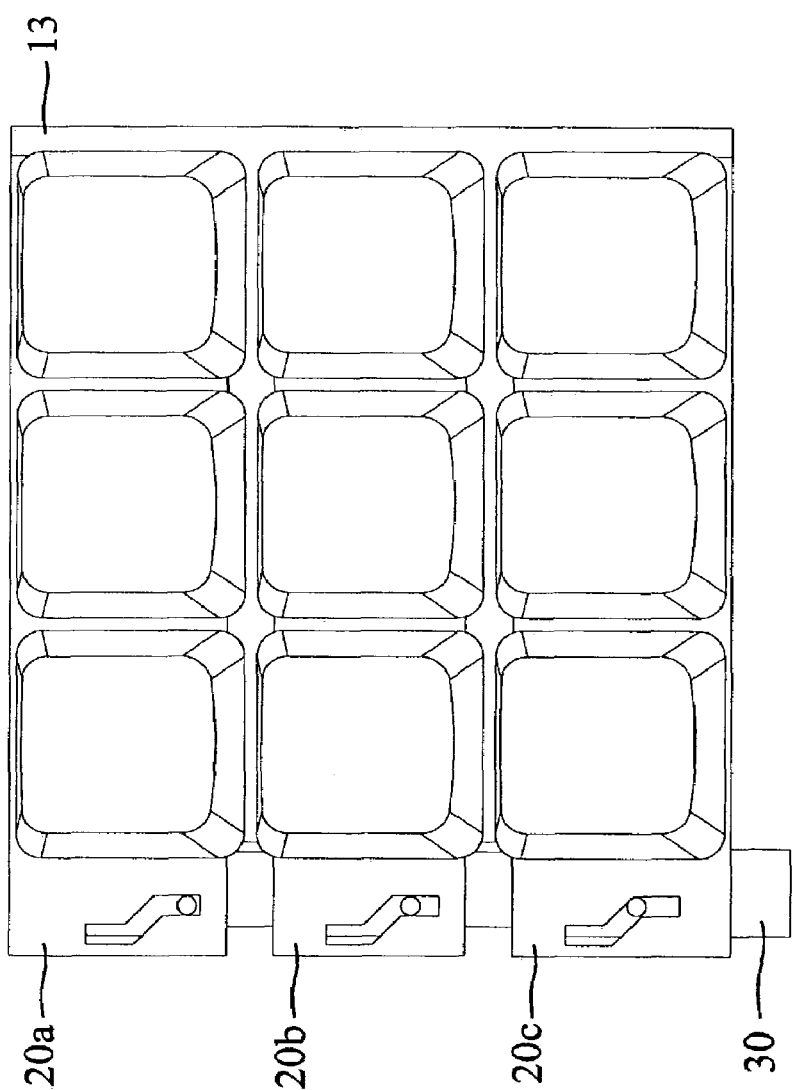
FIG. 4E is another schematic top view of the keyboard when the sliding member is at the end.

FIGS. 4E and 4F are schematic top and side views of the keyboard when the sliding member is at the end. In FIGS. 4E and 4F, the second interval D is smaller than the first interval d. While the sliding member keeps moving downward, the protrusions 31b, 31c push the guiding sheets 20b, 20c leftward at a first interval p. The cap supports 12 disposed over the guiding sheets 20b, 20c are depressed by the hooks 21b, 21c. All of the key caps 11a~11c are depressed to the depressed position.

While the sliding member 30 moves upward to the first position from the second position, the guiding sheets 20a~20c are sequentially guided rightward, and the key caps 11a~11c are released sequentially. In FIGS. 4E and 4F, the key caps are in the depressed position, initially. While the sliding member 30 keeps moving upward and, the guiding sheet 20c moves rightward, shown in FIGS. 4C and 4D, the hooks 21c of the guiding sheet 20c release the cap supports 12c of the guiding sheet 20c. The key caps 11c are elevated by the elastic force of the elastic domes and return to the elevated position. In FIGS. 4A and 4B, the key caps 11a and 11b are elevated sequentially.

Moreover, the guiding sheets 20a~20c are not limited to disposal the elastic sheet 13. They can be disposed between the elastic sheet 13 and the circuit membrane assembly 14, or between the circuit membrane assembly 14 and the base sheet 15. The first interval d between the guiding sheets also can be smaller the second interval D, such that the order in which the key caps are pressed or elevated is reversed.

Figure 5A:
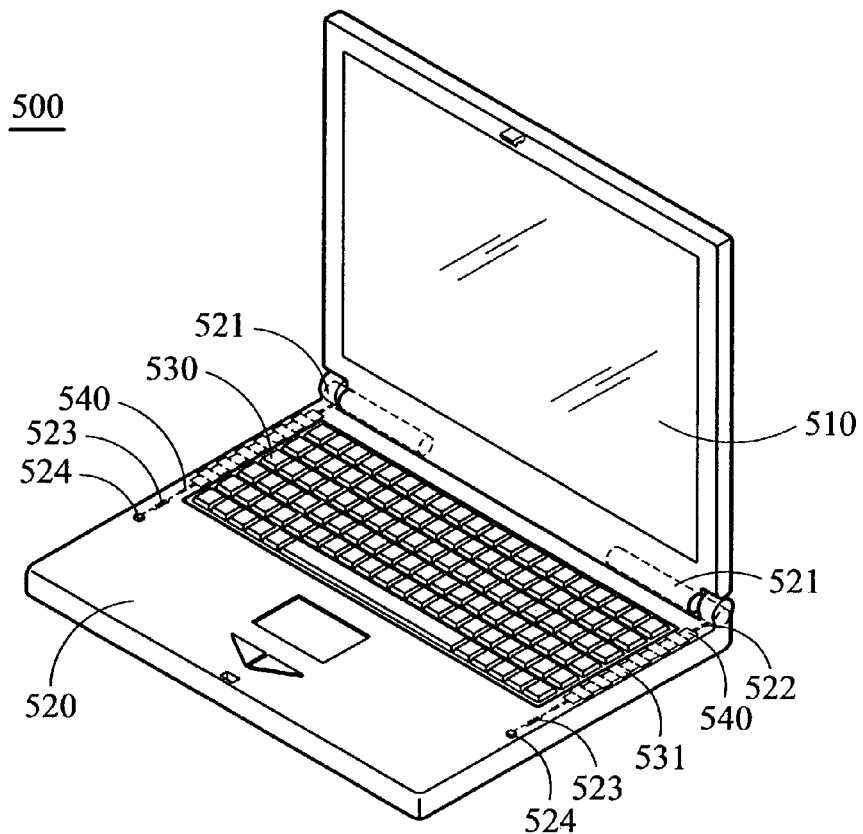
FIG. 5A is a schematic view of a notebook computer having the keyboard with elevated keys of the invention.
Figure 5B:
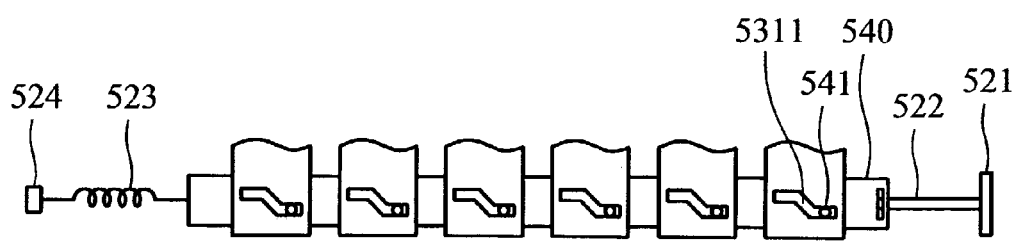
FIG. 5B is an enlarged section view of the operating assembly of the keyboard in FIG. 5A.

The keyboard with elevated keys of the invention can be used in a notebook computer. FIG. 5A is a schematic view of the notebook computer having the keyboard with elevated keys of the invention. FIG. 5B is an enlarged section view of the operating assembly of the keyboard in FIG. 5A. In FIGS. 5A and 5B, a notebook computer 500 has a flat display 510 pivoted on a main body 520 via two hinges 521. The keyboard 530 of the invention is assembled in the main body 520 of the notebook computer 500. The keyboard 530 has a plurality of guiding sheets 531 with tracks 5311 arranged at both ends. The main body 520 of the notebook computer 500 further includes two sliding members 540 disposed beside the keyboard 530. The sliding members 540 have a plurality of protrusions 541 by which the guiding sheets 531 can be pushed rightward or leftward, such that the keys of the keyboard 530 can be depressed in a depressed position or elevated to an elevated position. Furthermore, the operating assembly includes connecting belts 522 and springs 523. The connecting belt 522 connects one end portion of a sliding member 540 to the hinge 521 of the flat display 510. The spring 523 connects the other end portion of the sliding member 540 and a seat 524 of the main body 520.

Referring to FIGS. 5A and 5B, the sliding members 540 move to the flat display 510 when the flat display 510 is closed. The guiding sheets 531 move leftward and the keys of the keyboard are depressed to the depressed position. The sliding members 540 move opposite to the flat display 510 by the elastic force of the springs 523 when the flat display 510 is open. The guiding sheets 531 move rightward and the keys of the keyboard are released to the normal position.

According to the embodiments provided above, the keyboard with sequentially elevated keys of the invention can reduce required horizontal force as well as thickness and rigidity of the guiding sheets.

Moreover, the keys of the keyboard can be elevated by a plurality of horizontally moving guiding sheets. The keys of keyboard can be elevated when the flat display of notebook computer is open and can be depressed when the flat display closes. Thus, the thickness and weight of the notebook computer with elevated keys can be reduced, and the notebook computer with this keyboard of the invention has a thinner profile.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard with elevated keys, comprising:
   a foundation sheet;
   a plurality of key sets having a plurality of keys, wherein each of the keys has a key cap movably connected to the foundation sheet through a supporting mechanism and moves with respect to the foundation sheet between an elevated position and a depressed position;
   a plurality of guiding sheets, movably disposed on the foundation sheet and having a plurality of hooks and a track arranged in a first direction, wherein the distance between two neighboring guiding sheets is a first interval, and the guiding sheets move in a second direction from a first position to a second position; and
   a sliding member, movably disposed on the foundation sheet and having a plurality of protrusions extending into the tracks of the guiding sheets, wherein the distance between two neighboring protrusions is a second interval, the second intervals are unequal to the first intervals, and when the sliding member moves in the first direction, the protrusions move the guiding sheets in the second direction from the first position to the second position, such that the hooks contact the supporting mechanisms to sequentially depress the key caps of each key set from the elevated position to the depressed position.

2. The keyboard as claimed in claim 1, wherein the first direction is perpendicular to the second direction.

3. The keyboard as claimed in claim 1, wherein each supporting mechanism includes a first linking bracket and a second linking bracket pivoted together to form a scissors-type linking mechanism.

4. The keyboard as claimed in claim 1, wherein each key of the key sets has an elastic dome disposed between the key cap and the foundation sheet.

5. The keyboard as claimed in claim 4, wherein when the sliding member moves in the second direction, the protrusions move the guiding sheets from the second position to the first position, such that the hooks release the supporting mechanisms, and the key caps are elevated by the elastic domes.

6. The keyboard as claimed in claim 1, wherein each of the tracks has a first portion, a second portion and a connecting portion, the first portion and the second portion are parallel to the first direction and connected by the connecting portion.

7. The keyboard as claimed in claim 6, wherein the distance between the first portion and the second portion is a third interval, equal to the distance between the first position and the second position.

8. A keyboard for a notebook computer having a flat display pivoted on a main body, comprising:
   a foundation sheet, fixed on the main body;
   a plurality of key sets having a plurality of keys, wherein each of the keys has a key cap movably connected to the foundation sheet through a supporting mechanism and moves with respect to the foundation sheet between an elevated position and a depressed position;
   a plurality of guiding sheets, movably disposed on the foundation sheet and having a plurality of hooks and a track arranged in a first direction, wherein the distance between two neighboring guiding sheets is a first interval, and the guiding sheets move in a second direction from a first position to a second position; and
   a sliding member, movably disposed on the foundation sheet and having a plurality of protrusions extending into the tracks of the guiding sheets, wherein the distance between two neighboring protrusions is a second interval, the second intervals are unequal to the first intervals; and
   means for moving the sliding member in the first direction, wherein when the sliding member moves in the first direction, the protrusions move the guiding sheets in the second direction from the first position to the second position, such that the hooks contact the supporting mechanisms to sequentially depress the key caps of each key set from the elevated position to the depressed position.

9. The keyboard as claimed in claim 8, wherein the first direction is perpendicular to the second direction.

10. The keyboard as claimed in claim 8, wherein each of the supporting mechanism includes a first linking bracket and a second bracket pivoted together to form a scissors-type supporting mechanism.

11. The keyboard as claimed in claim 8, wherein each key of the key sets has an elastic dome disposed between the key cap and the foundation sheet.

12. The keyboard as claimed in claim 11, wherein the operating means include a connecting belt and a spring, the connecting belt connects one end portion of the sliding member to the flat display, the spring connects the other end portion of the sliding member to the main body, and when the flat display is opened, the sliding member moves in the second direction, and the protrusions move the guiding sheets from the second position to the first position, such that the hooks release the scissors-type linking mechanisms, and the key caps are elevated by the elastic domes.

13. The keyboard as claimed in claim 8, wherein each of the tracks has a first portion, a second portion and a connecting portion, the first portion and the second portion are parallel to the first direction and connected by the connecting portion.

14. The keyboard as claimed in claim 13, wherein the distance between the first portion and the second portion is a third interval, equal to the distance between the first position and the second position.

* * * * *